United States Patent [19]

O'Hara

[11] Patent Number: 5,182,146
[45] Date of Patent: Jan. 26, 1993

[54] DECORATIVE VEHICLE AIR SPEED INDICATOR

[76] Inventor: Robert S. O'Hara, 2117 Willow St., Port Townsend, Wash. 98368

[21] Appl. No.: 665,689

[22] Filed: Mar. 7, 1991

[51] Int. Cl.⁵ .............................................. B60R 13/00
[52] U.S. Cl. ..................................... 428/31; 40/413; 40/591
[58] Field of Search ................... 40/413, 415, 591, 597; 428/31; 446/217

[56] References Cited

U.S. PATENT DOCUMENTS

| | | | |
|---|---|---|---|
| 462,586 | 11/1891 | Plecker | 248/48.1 |
| 1,645,702 | 10/1927 | Ischinger | 446/217 |
| 2,302,300 | 11/1942 | Davies | 224/42.45 R |
| 2,508,824 | 5/1950 | Henley | 116/47 |
| 2,637,928 | 5/1953 | Tufts | 40/413 |
| 3,395,482 | 8/1968 | Sarro | 446/241 |
| 4,080,826 | 3/1978 | Perretta | 73/188 |
| 4,223,631 | 9/1980 | Poad | 116/265 |
| 4,522,069 | 6/1985 | Birnbaum | 73/188 |
| 4,561,301 | 12/1985 | Steele | 73/188 |

FOREIGN PATENT DOCUMENTS 1139267  6/1957  France .
462586   3/1937  United Kingdom ....... 116/DIG. 24

*Primary Examiner*—Henry F. Epstein
*Attorney, Agent, or Firm*—Trask, Britt & Rossa

[57] ABSTRACT

An air speed indicator (10) for use in combination with a vehicle (20) having an exterior surface (18). The indicator (10) comprises a shaft (12) mounted to the vehicle (20) by a means of a mounting member (16) such that the shaft (12) is angled away from the direction of relative airflow (50). A propeller (14) is mounted on the shaft (12) through a tapered opening (32) that enables the propeller (14) to precess on the shaft (12) and thereby change the axis of rotation with consequent changes in the direction of movement of the propeller (14) on the shaft (12). Decorative and ornamental features include the retaining member (26) at the top end of the shaft (12) and beads (52) mounted above and below the propeller (14).

12 Claims, 2 Drawing Sheets

DECORATIVE VEHICLE AIR SPEED INDICATOR

TECHNICAL FIELD

The present invention pertains to devices for indicating the relative speed of air with respect to a moving vehicle, and, more particularly, to a decorative air speed indicating device that is removably mounted on a vehicle, such as a car, motorcycle, boat, etc., and includes an indicator that moves along a shaft in response to changes in the air speed.

BACKGROUND OF THE INVENTION

Relative air speed indicators are utilized where it is desirable or necessary to have a visual indication of air speed with respect to a moving vehicle. In other words, "relative air speed" or "air speed" as used herein means the speed of a vehicle as it passes or moves through a body of air. "Ground speed" is used herein to denote the speed of the vehicle with respect to land or water; and "wind speed" will refer to the speed of air with respect to land or water.

Thus, air that is stationary on land or water will have a zero wind speed. A vehicle moving across the land or water and through a stationary body of air will have a ground speed that is the same as its air speed. If the body of air is moving across the land or earth in the same direction as the vehicle is traveling, then the vehicle's ground speed will be higher than the vehicle's air speed. Hence, relative air speed will be higher or lower than ground speed, depending on the wind speed vector, i.e., the direction and speed of the wind.

Typically, relative air speed indicators are of two types. The first type utilizes a visual indicator mounted on the exterior of the vehicle. Air speed is observed by viewing the visual indicator directly. The second type comprises a sensor on the exterior of the vehicle that communicates with a visual indicator mounted on the interior of the vehicle. This second type of air speed indicator has the disadvantage of requiring extensive modification to install on existing vehicles. Furthermore, this type of indicator is designed to communicate only air speed and has no decorative or ornamental features associated with the indication or display of air speed.

SUMMARY OF THE INVENTION

The present invention is directed to a decorative vehicle air speed indicator for use on a vehicle having a surface thereon for mounting the air speed indicator. The indicator comprises a propeller or an impeller formed of a hub and two or more blades projecting from the hub; a shaft received through a hole, preferably tapered in diameter, in the hub on which the hub rotates; a retaining member mounted on one end of the shaft for retaining the hub on the shaft; and a mounting apparatus on the other end of the shaft to mount the shaft to the vehicle surface, such that the propeller or impeller will rotate about the shaft as the vehicle moves through the air and will move along the shaft in response to changes in the air speed.

In accordance with another aspect of the present invention, a plurality of ornaments are slidably received on the shaft to erratically move in response to the flow of air. More particularly, the ornaments will erratically spin and move upward and downward along the shaft.

In accordance with yet another aspect of the present invention, the ornaments consist of a plurality of beads of one or more colors having a central opening formed thereon through which the shaft is received.

In accordance with yet another aspect of the present invention, the air speed indicator further includes a suction cup for use in removably mounting the air speed indicator to the surface of the vehicle without marring the surface of the vehicle.

As will be readily appreciated from the foregoing description, the present invention provides a unique relative air speed indicator that is functional, ornamental, and provides amusement to those observing the movement of the propeller or impeller and the beads on the shaft. In addition, the device will provide a fairly reliable indication of the relative air speed with respect to the vehicle. Furthermore, the suction cup enables easy mounting and removal of the indicator without marring the surface of the vehicle.

BRIEF DESCRIPTION OF THE DRAWINGS

The foregoing and other features and advantages of the present invention will be more readily appreciated as the same becomes better understood from the detailed description when taken in conjunction with the following drawings, wherein.

DETAILED DESCRIPTION OF THE PREFERRED EMBODIMENT

Figure 1:
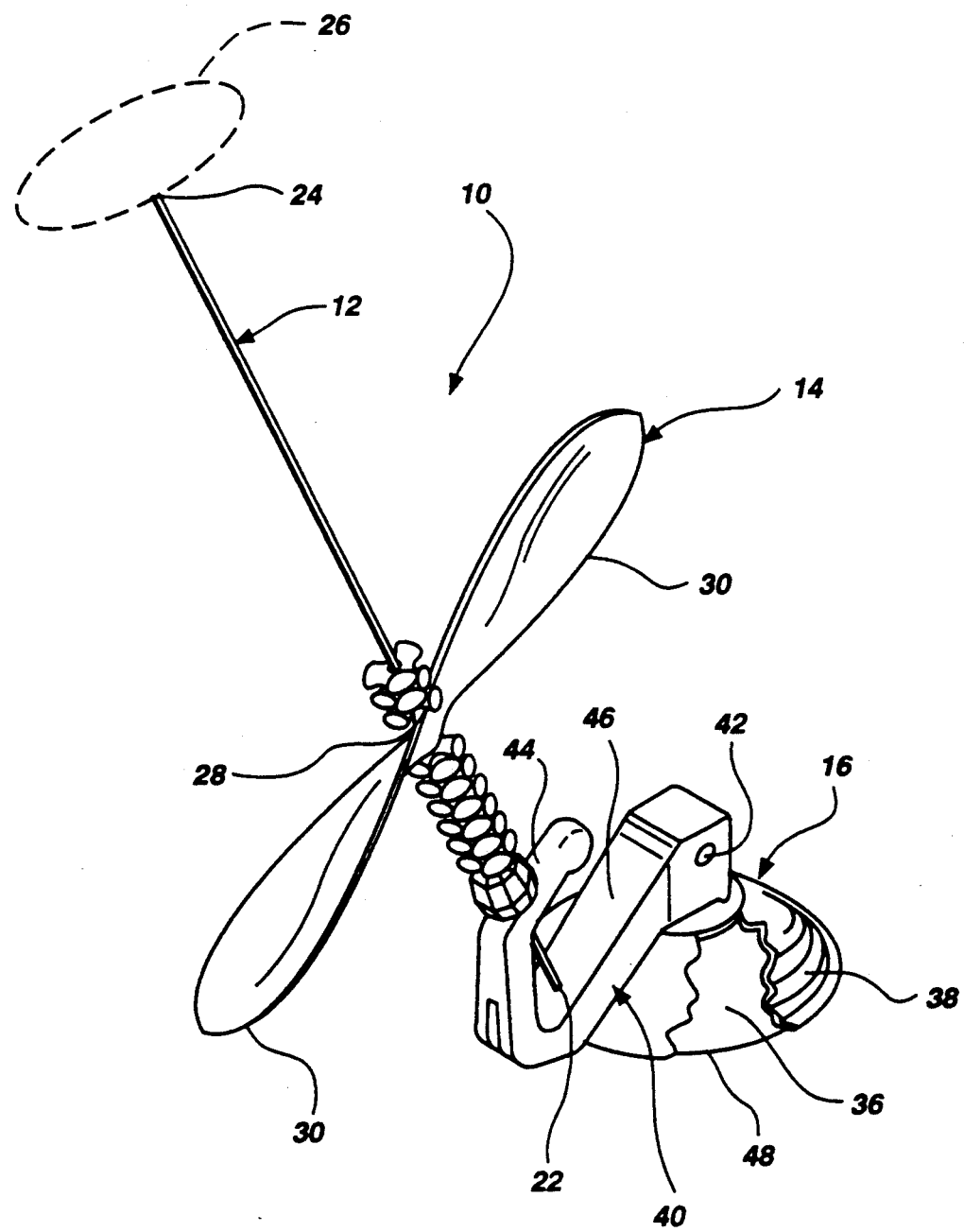
FIG. 1 is an isometric view of a decorative vehicle air speed indicator formed in accordance with the present invention.

Referring initially to FIG. 1, illustrated therein is a decorative vehicle air speed indicator 10 formed in accordance with the present invention. The indicator 10 comprises generally a shaft 12 having a propeller 14 mounted thereon, and a mounting member 16 for mounting the shaft 12 to the exterior surface 18 of a vehicle 20 (shown in FIG. 2). The shaft 12 has a first end 22 received in the mounting member 16 and a second end 24 on which is positioned a retaining member 26. The retaining member 26 is shown in phantom because it may consist of any suitable object or device. In the preferred embodiment, the retaining member 26 is a small decorative ornament, such as an animal or other decorative shape that is attached to the second end 24 of the shaft 12 to retain the propeller 14 on the shaft 12.

The propeller 14 is comprised of a hub 28 having two blades 30 projecting outward therefrom. The hub 28 has an opening 32 formed therethrough that is sized and shaped to enable the propeller 14 to be slidably received on the shaft 12 and to rotate thereon. Ideally, each of the blades 30 is twisted so that the effective cross-sectional area of the blade 30 has camber and a corresponding lift coefficient. As such, each blade 30 will generate a lifting force as the propeller 14 rotates that will drive the propeller 14 downward on the shaft 12. This lifting force is expressed as thrust that, as the propeller rotates in a counter-clockwise direction, shown by the arrows 34 in FIGS. 2 and 3, acts to drive the propeller 14 downward towards the first end 22 of the shaft 12, as will be explained in more detail herein below.

Alternatively, the propeller 14 may be in the form of an impeller, i.e., a rotor having blades without camber and having their free ends unattached or enclosed within a cylindrical hoop. However, it has been found that a propeller such as the propeller 14 described above easily achieves the performance objectives of the present invention, whereas the former are only marginally successful, if at all. Preferably, each propeller 14 is formed of lightweight material, such as plastic, which is readily commercially available from many sources.

The mounting member 16 is also readily commercially available and will not be described in detail herein. Briefly, the mounting member 16 includes a suction cup 36 mounted inside a case 38. The suction cup 36 is attached to a hook 40 that rotates about an axle pin 42. The shaft 12 projects through the outside leg 44 of the hook 40 and into the base 46 of the hook 40 where it is suitably fastened in place.

In operation, the indicator 10 should be first mounted to a clean, shiny spot on the exterior surface 18 of the vehicle 20. This is accomplished by moistening the rim 48 of the suction cup 36. The mounting member 16 is then positioned at the desired location with the hook 40 rotated about the axle pin 42 so that the shaft 12 is pointing in a direction to the right of that shown in FIG. 1. Pressure is then applied to the hook 40 only to remove air from under the suction cup 36. The hook 40 is then flipped back over to the position shown in FIG. 1 so that the suction cup 36 is firmly held in place between the case 38 and the exterior surface 18 of the vehicle 20. For safety, the indicator 10 should never be installed on a vehicle 20 where it can interfere with or obstruct the driver's vision.

Figure 2:
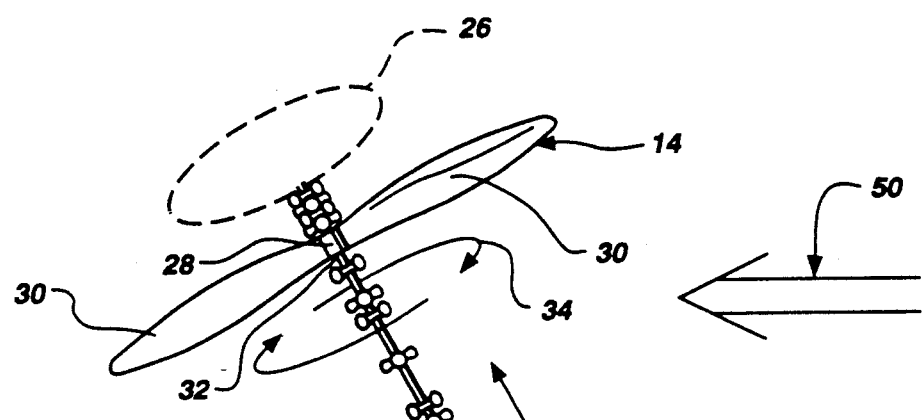
FIG. 2 is a side plan view of the decorative vehicle air speed indicator of FIG. 1 as mounted to the surface of a vehicle and illustrating the initial movement of the impeller and ornaments in response to air flow.
Figure 3:
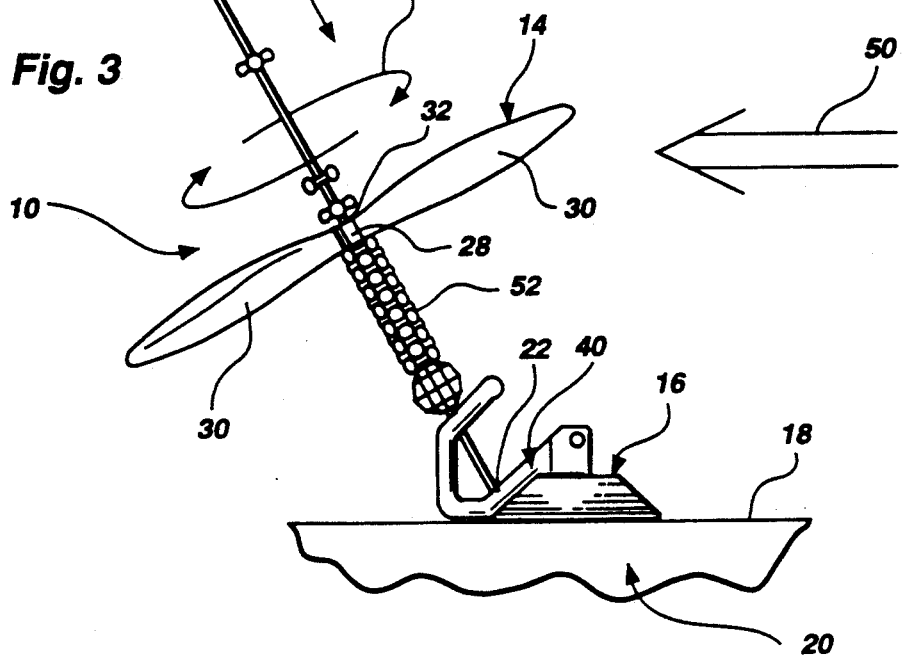
FIG. 3 is a side plan view of the decorative vehicle air speed indicator of FIG. 2 illustrating the downward movement of the propeller on the shaft in response to increased air speed as the propeller momentarily reduces its windward profile and releases stored rotational energy as downward thrust.

The indicator 10 should always be installed so that the shaft 12 is pointed away from the direction in which the vehicle 20 is traveling. Referring next to FIG. 2, as the vehicle 20 is moving through the air, the force of the air, depicted by the arrow 50, will impact the propeller 14 and cause it to slide upward on the shaft 12 until further movement is prevented by the retaining member 26. The air 50 interacting with the blades 30 will cause the propeller 14 to rotate in a counterclockwise direction, as indicated by the arrows 34. As the speed of the vehicle increases, the relative air speed 50 will also increase, causing the propeller 14 to rotate more rapidly. As this occurs, the propeller 14 will generate thrust. The blades 30 are configured so that as lift is generated, the thrust will be in the downward direction to urge the propeller 14 downward towards the first end 22 of the shaft 12. Furthermore, the tapered or conical opening 32 in the hub 28 permits the propeller to precess on the shaft 12 and change its axis of rotation. This results in changes in the angle of attack of the blades 30 and also temporarily reduced friction releasing stored rotational energy as downward thrust. As a result, the propeller 14 will move up and down the shaft 12 in response to changes in the relative air speed.

To provide amusement and ornamentation, beads 52 are slidably received on the shaft 12. These beads will move along the shaft 12 in response to changes in the speed of the air 50 at a rate that is different than that of the propeller 14. The erratic movement of these beads 52 as well as the movement of the propeller 14 provides not only an indication of air speed but also amusement for passengers in the vehicle 20. It is to be understood that other ornamental devices may be used on the shaft 12 in place of or in combination with the beads 52. These other ornamental devices can include dice, rings, washers, prisms, and other polyhedra, and shells, buttons, etc.

While a preferred embodiment of the invention has been illustrated and described herein, it is to be understood that various changes can be made therein without departing from the spirit and scope of the invention. For instance, while the relative angle of the shaft 12 with respect to the exterior surface 18 of the vehicle 20 can be altered by changing the position of the hook 40 on the mounting member 16, other methods may be used for enabling changes in the position of the shaft 12. Consequently, the scope of the invention is to be limited only by the appended claims.

The embodiments of the invention in which an exclusive property or privilege is claimed are defined as follows:

1. An air speed indicator for use on a vehicle having an exterior surface, the indicator comprising:
    a rotor having a hub with a tapered opening and blades;
    a straight, elongate shaft slidably received through said tapered opening in said rotor and having a smooth exterior surface to facilitate rotation of said rotor on said shaft; and
    means for mounting said shaft to an exterior surface of a vehicle with the shaft positioned at a predetermined angle away from the relative airflow such that said rotor will rotate on said shaft and freely slide in both directions along said shaft in response to the relative airflow.

2. The indicator of claim 1, wherein said predetermined angle is at a degree of inclination that cooperates with said tapered opening in said rotor to enable said rotor to precess on said shaft and thereby change the direction of movement along said shaft at any location on said shaft.

3. The indicator of claim 2, further comprising an ornamental retaining member mounted on one end of said shaft for retaining said rotor on said shaft.

4. The indicator of claim 3, further comprising one or more ornamental members slidably received on said shaft to move along said shaft in response to movement through the air.

5. The indicator of claim 4, wherein said one or more ornamental members comprises one or more beads.

6. The indicator of claim 4, wherein said one or more ornamental members comprises a pair of dice.

7. The indicator of claim 4, further comprising a mounting member for mounting said shaft to the exterior surface of the vehicle, said mounting member being configured to enable adjustment in the angle of said shaft with respect to the exterior surface of the vehicle.

8. An air speed indicator for use in connection with a vehicle having an exterior surface, the indicator comprising:
    an elongate shaft having a first end and a second end and a smooth exterior surface;
    a mounting member for mounting the first end of the shaft to an exterior surface of a vehicle at a predetermined angle with respect to the exterior surface of the vehicle and relative airflow;
    a propeller having a hub and two or more blades projecting from said hub, said hub further having a tapered opening therein sized and shaped to enable said propeller to be slidably received on said shaft and to rotate thereon, each of said one or more blades further configured to have a lift coefficient when air flows over said blade to thereby generate thrust; and an ornamental retaining member mounted on said second end of said shaft for retaining said propeller in slidable engagement on said shaft as said propeller rotates and moves along said shaft so that as said vehicle moves through the air, the force of the relative airflow will urge said propeller to slide along said shaft towards said retaining member while further causing said propeller to rotate and generate thrust, said predetermined angle is at a degree of inclination that cooperates with said tapered opening in said rotor to enable said rotor to precess on said shaft and thereby change the direction of movement along said shaft at any location on said shaft.

9. The indicator of claim 8, wherein said mounting member includes an articulated joint with said shaft to permit adjustment in the angle of said shaft with respect to the exterior surface of the vehicle.

10. The indicator of claim 8, further including one or more ornamental members slidably received on said shaft to move along said shaft in response to changes in air speed.

11. The indicator of claim 10, wherein said one or more ornamental members comprises a pair of dice.

12. The indicator of claim 10, wherein said one or more ornamental members comprises beads.

* * * * *